(No Model.)  6 Sheets—Sheet 2.
G. F. SIMONDS.
METHOD OF MAKING IRREGULAR SHAPED METAL ARTICLES.
No. 419,292.  Patented Jan. 14, 1890.
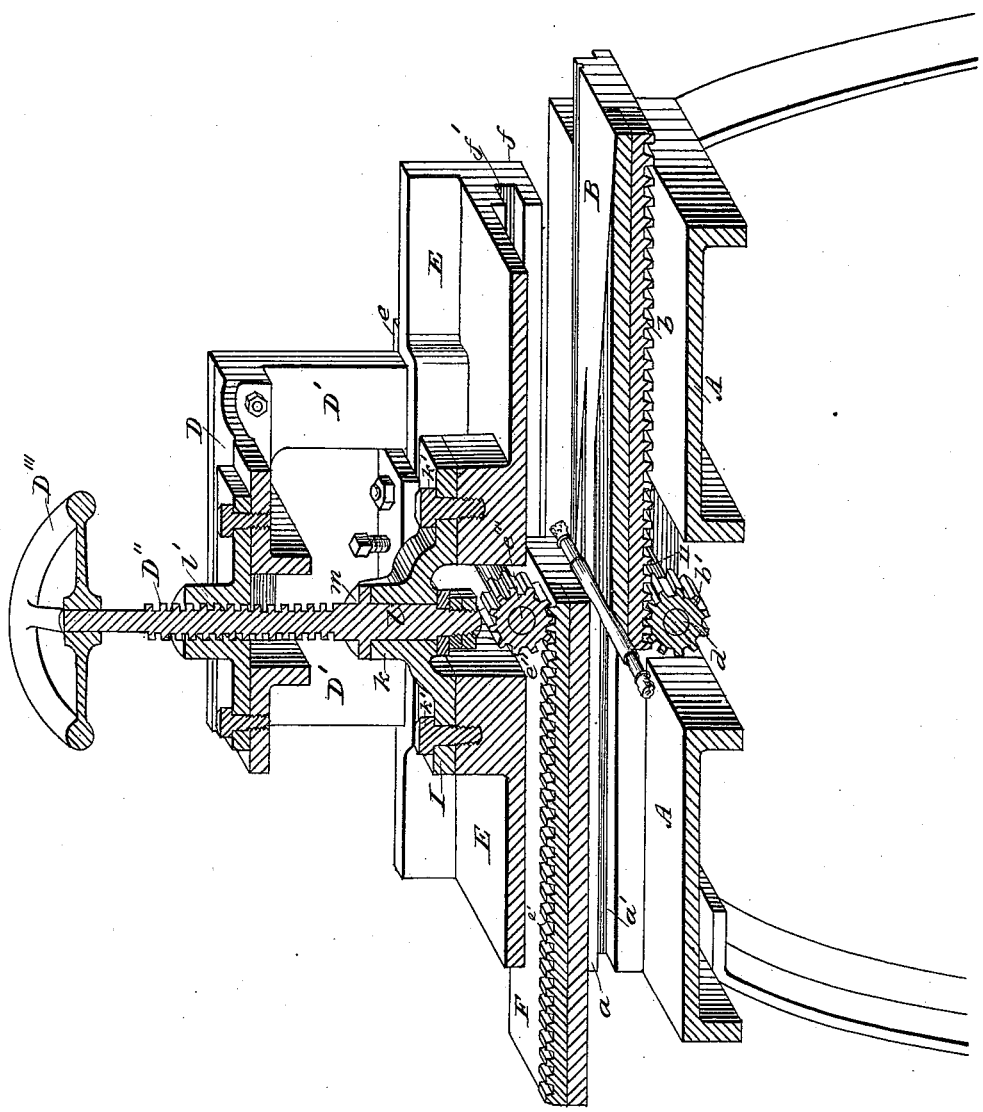
Witnesses:
T. C. Brecht
J. W. Stearns
Inventor:
George F. Simonds,
By R. K. Evans
Attorney.

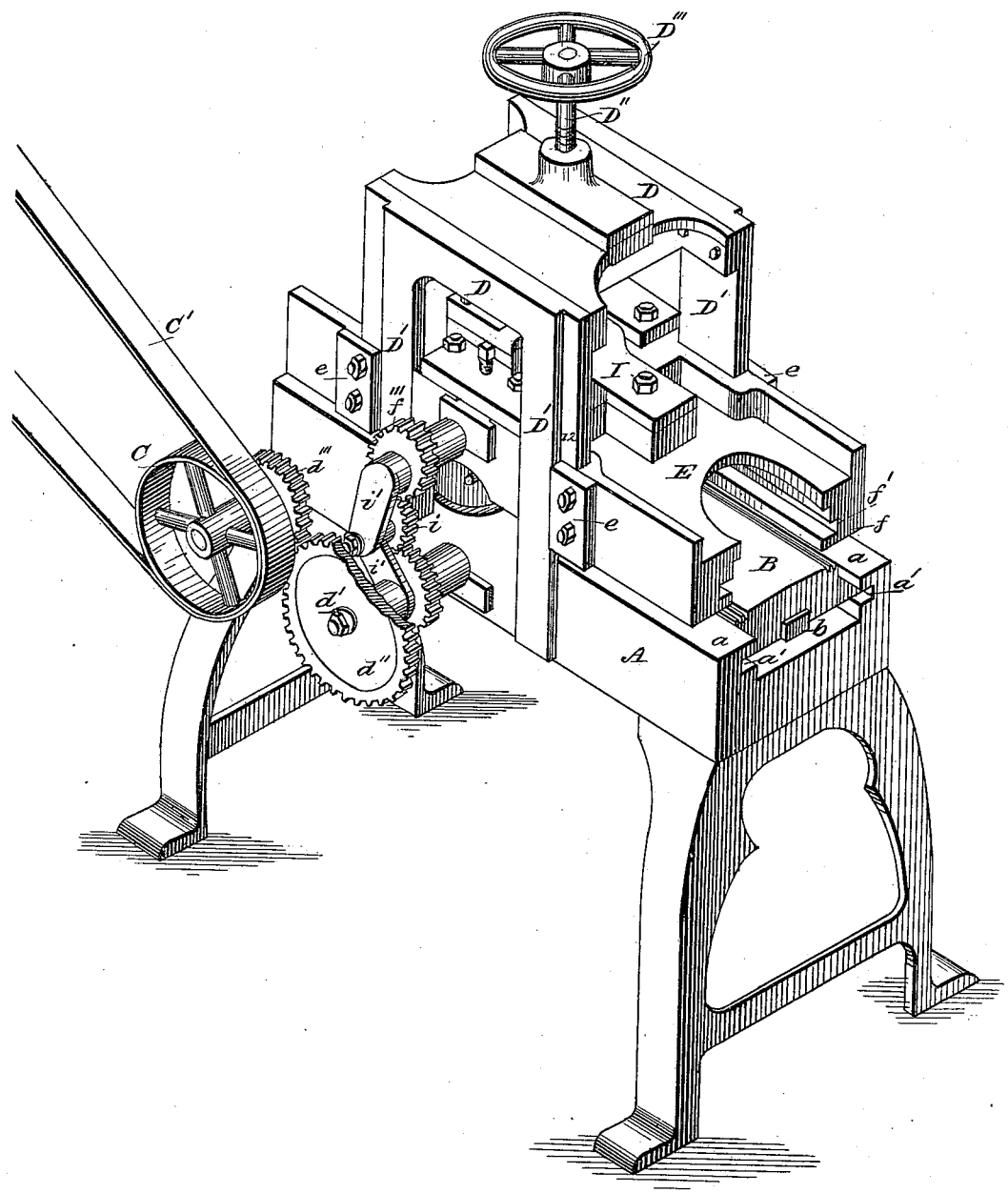

(No Model.) 6 Sheets—Sheet 3.
G. F. SIMONDS.
METHOD OF MAKING IRREGULAR SHAPED METAL ARTICLES.
No. 419,292. Patented Jan. 14, 1890.
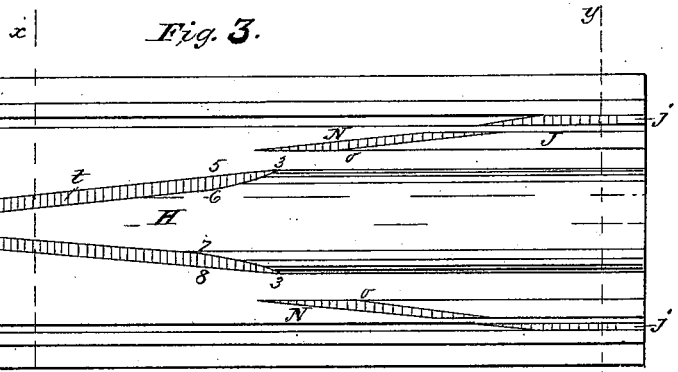
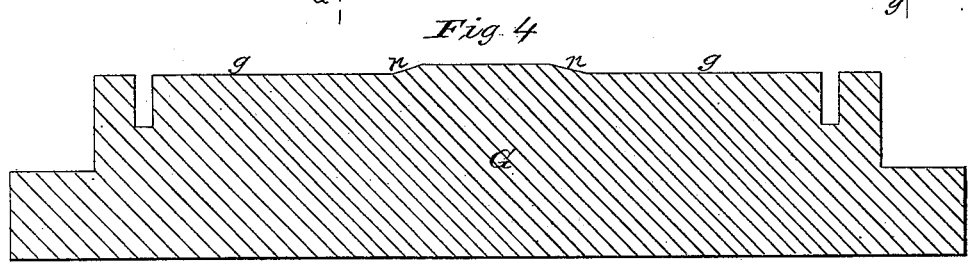
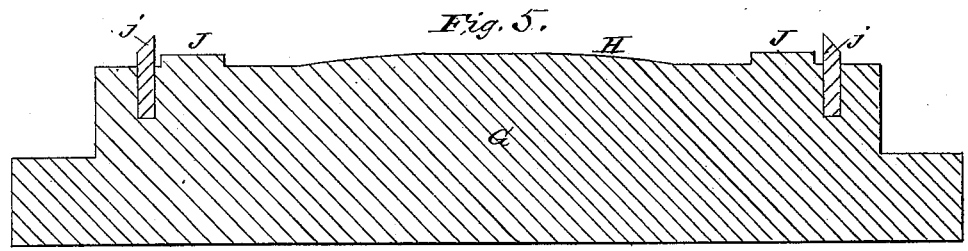
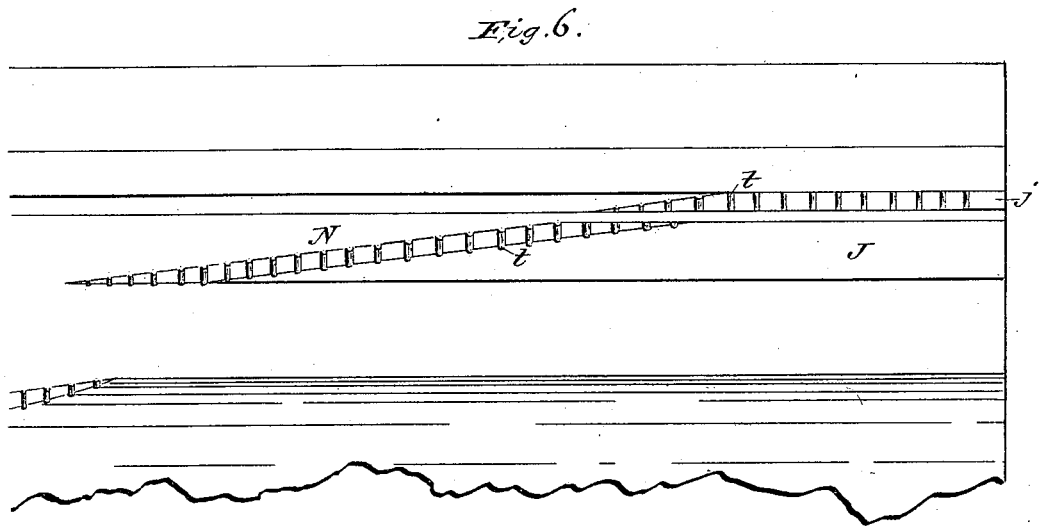
Witnesses
J. W. Stearns.
F. D. Ellsworth
Inventor
George F. Simonds,
By R. K. Evans
Attorney.

(No Model.) 6 Sheets—Sheet 4.

G. F. SIMONDS.
METHOD OF MAKING IRREGULAR SHAPED METAL ARTICLES.

No. 419,292. Patented Jan. 14, 1890.

Witnesses
J. W. Stearns
F. D. Ellsworth.

Inventor
George F. Simonds,
By R. K. Evans
Attorney.

(No Model.) 6 Sheets—Sheet 5.

G. F. SIMONDS.
METHOD OF MAKING IRREGULAR SHAPED METAL ARTICLES.

No. 419,292. Patented Jan. 14, 1890.

Witnesses
J. W. Stearns
F. D. Ellsworth

Inventor
George F. Simonds,
By R. K. Evans
Attorney.

(No Model.) 6 Sheets—Sheet 6.

G. F. SIMONDS.
METHOD OF MAKING IRREGULAR SHAPED METAL ARTICLES.

No. 419,292. Patented Jan. 14, 1890.

Witnesses:
T. C. Brecht
Louis Beyer

Inventor:
George F. Simonds,
By R. K. Evans
Attorney.

United States Patent Office.

GEORGE F. SIMONDS, OF FITCHBURG, MASSACHUSETTS, ASSIGNOR TO THE SIMONDS ROLLING MACHINE COMPANY, OF MASSACHUSETTS.

METHOD OF MAKING IRREGULAR-SHAPED METAL ARTICLES.

SPECIFICATION forming part of Letters Patent No. 419,292, dated January 14, 1890.

Application filed March 24, 1885. Serial No. 160,016. (No model.)

*To all whom it may concern:*

Be it known that I, GEORGE F. SIMONDS, of Fitchburg, in the county of Worcester and State of Massachusetts, have invented certain Improvements in Methods for Making Wrought-Metal Forgings that are Circular in Cross-Sectional Area; and I hereby declare the following to be a full, clear, and exact description thereof, reference being had to the accompanying drawings, making part of this specification, in which—

Figure 7:
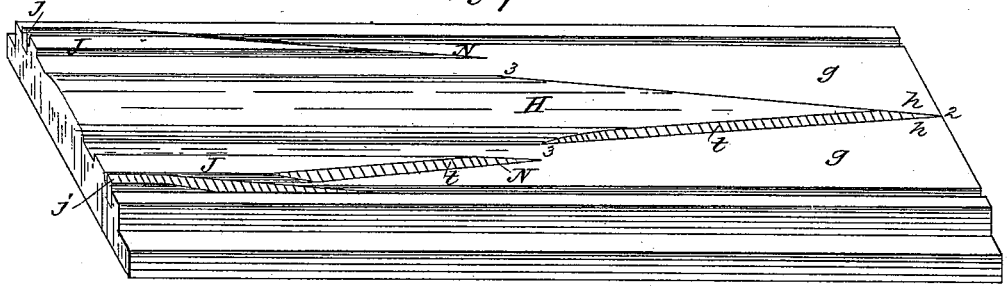
Figure 13:
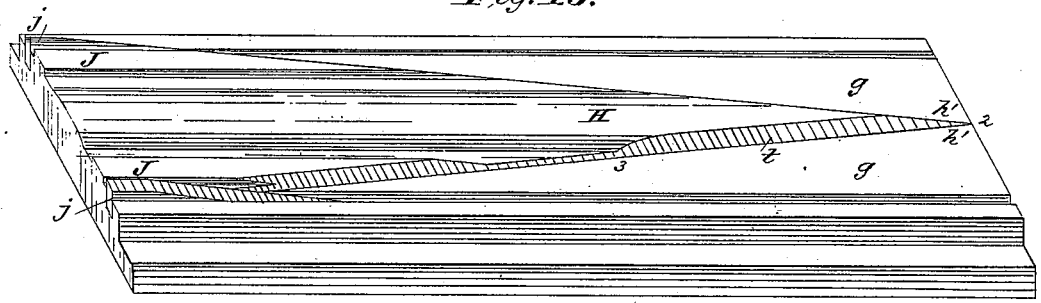
Figure 12:
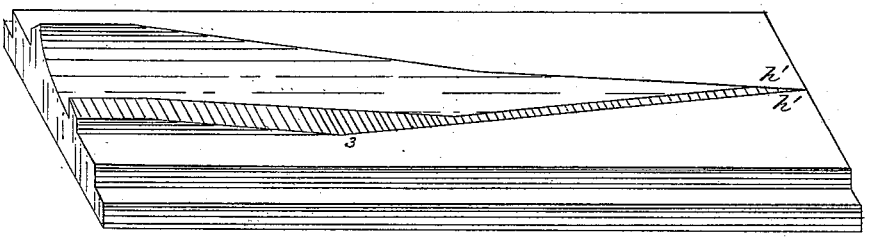
Figure 8:
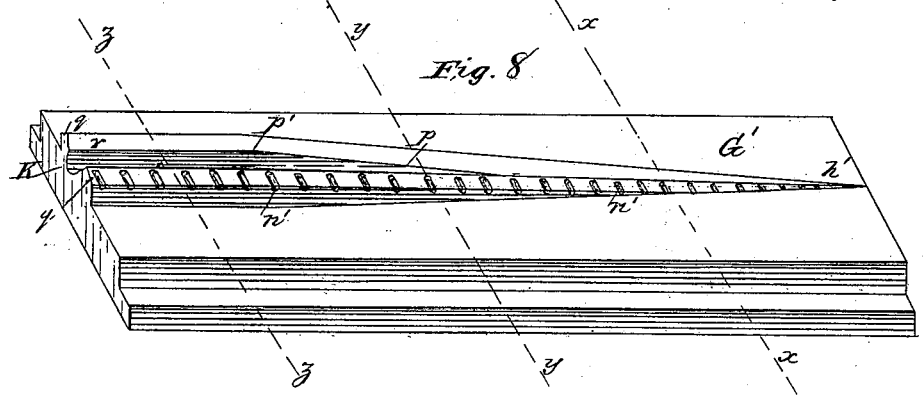
Figure 9:
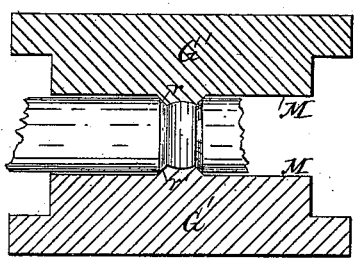
Figure 10:
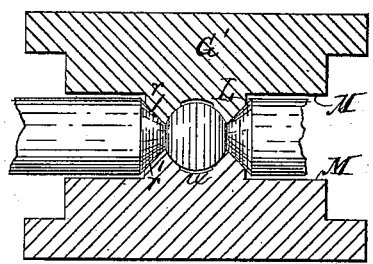
Figure 11:
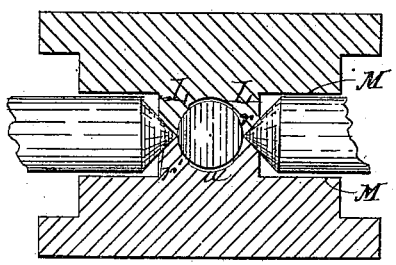
Figure 14:
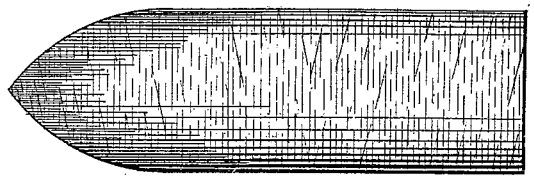
Figure 15:
Figure 16:
Figure 17:
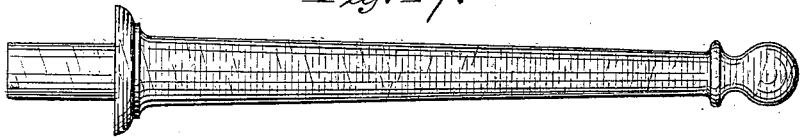

Figure 1 is a perspective view of a machine designed to carry out my improved method. Fig. 2 is a perspective view of the machine, the parts cut in longitudinal vertical section. Fig. 3 is a plan view of the die-face on a platen designed to be used in my machine. Fig. 4 is a vertical section on the line $x\ x$ of Fig. 3. Fig. 5 is a vertical section on line $y\ y$ of Fig. 3. Fig. 6 is an enlarged broken plan showing a portion of the forming-face when the operation of forming or shaping is completed. Fig. 7 is a perspective view of Fig. 3. Fig. 8 is a perspective view of a platen and die to form spherical articles. Fig. 9 is a cross-section on line $x\ x$ of Fig. 8. Fig. 10 is a cross-section on the line $y\ y$ of Fig. 8. Fig. 11 is a section on line $z\ z$ of Fig. 8. Fig. 12 illustrates a modification for rolling conical articles. Fig. 13 illustrates a modification of the form of die-face. Figs. 14, 15, 16, and 17 illustrate types of the work produced by my method.

My invention consists in a novel method of making wrought-metal forgings which are circular in cross-sectional area.

In order that those skilled in the art may make and use my invention, I will proceed to describe the manner in which I have carried it out.

In the said drawings, A is a frame or support mounted in any desirable way and having extending along each edge projecting ribs $a\ a$, into the inner faces of which are cut ways or grooves $a'\ a'$ to receive and sustain the edges of the platen B. This platen B has on its lower face, in a central longitudinal line, a rack-bar $b$, which engages with a pinion $b'$, located on a shaft $d$ under the center of the bed of the machine, and driven by shaft $d$ and gearing $d'$, $d''$, and $d'''$, actuated by pulley C, moved by belt $C'$ from an ordinary reversing-pulley on the counter-shafting. (Not shown in the drawings.) Mounted on shaft $d$ on each side of the pinion $b'$ are rollers which back up and strengthen platen B against the thrust of the billet or blank being worked upon.

The frame A carries a vertical yoke D, having four supports or standards $D'$ and a central screw $D''$ and hand-wheel $D'''$. Secured to the standards $D'$, by means of ears or overlapping plates $e\ e$, which engage grooves or recesses 12 12 in the standards so as to have a vertical movement therein, is a platen-sustaining carriage E, having on its outer edges downwardly-projecting ribs or flanges $f$, provided on their inner faces with grooves $f'$ for the reception of ribs $f''$ on the edges of an upper platen F. On a central longitudinal line the upper surface of the platen F is provided with a rack-bar $e'$, similar to rack-bar $b$ on the lower side of platen B, and said rack-bar $e'$ engages with and is driven by a pinion $e''$, shaft $e'''$, and gear-wheel $f'''$ through the medium of pinion $i$, mounted in the link-hanger $i'$, and gears $d''\ d'''$ with their pulley C. On each side of pinion $e''$ and on the same shaft $e'''$ are rollers which back up and sustain platen F against the thrust of the work and prevent the platen from springing.

On the center of the platen-sustaining carriage E is a pillow-block $k$, secured by bolts $k'\ k'$ and forming a bearing at $l$ for the lower end of the screw $D''$, the thread of said screw fitting a tap $l'$ in the center of the top of yoke D, and a collar $m$, fixed to the screw, bears on the top of the pillow-block. (See Fig. 2.) A washer and jam-nuts on the lower end of the screw prevent it from being withdrawn from the pillow-block when the screw is run up to raise carriage E and platen F with the driving devices and rolls, and when the carriage E is to be forced down to crowd the platen F toward platen B, so as to bring their working-faces more nearly together, the collar $m$ sustains the thrust of the screw.

When an article is to be subjected to the action of the platens, the upper platen is raised by drawing up carriage E through the medium of screw $D''$. The article is inserted between the platens, the upper platen is brought down by the screw on the article, and by means of the gearing described the platens are reciprocated alternately in opposite directions, and press or shape or otherwise affect the article to the point desired, the platens being meanwhile backed or braced by rolls (not shown) on the same shafts which actuate the platens.

The number of pillow-blocks and screws to sustain the movable carriage may be increased or diminished accordingly as it may be desirable or the exigencies of the work may demand.

I will now proceed to describe in detail the construction of the dies.

In the said drawings, G is the body of the platen, which, for purposes of illustration in this instance, I have shown as made for rolling railroad-car axles. The dies have plane faces $g$, which lie parallel to each other when in position for work, and from these plane faces rise the forming and reducing and spreading surfaces, the planes $g$ serving to support and steady the work and prevent it from rocking on the diverging, forming, and reducing and spreading surfaces. The reducing-faces commence to work on the metal at the end 2 and finish their work at the end 3. When the heated bar, ingot, or fagot is placed between the dies, the central reduction of the axle is commenced by the narrow end $h$ of the tapering raised portion H of the die-face. The edges of the raised portion are beveled obliquely with the plane surface $g$ of the die toward the end $h$, where the lines merge, or substantially so. The approximately-vertical planes 5 6 $h$ and 8 7 $h$, which I denominate the "reducing" and "spreading" surfaces, and the approximately-horizontal plane 6 7 $h$, which I call the "shaping" or "forming" surface, perform the work of spreading and shaping the metal, the surplus metal being crowded laterally and leaving the work in the proper shape. To cause the die-faces to work to the best advantage, the diverging angles of the raised surface 6 7 $h$ should bear such a relation to the width and pitch of the faces 5 6 $h$ and 8 7 $h$ as to prevent the unworked part of the metal as it rotates from overlapping on the forming portion of the die-face and making cold shuts and similar inaccuracies.

When found necessary, I provide the reducing and spreading surfaces 5 6 $h$ and 8 7 $h$ with irregularities or grooves $t\ t$, so that such irregularities will engage in the plastic metal and insure perfect regularity in the rotation of the ingot, fagot, or blank on its axis by means only of those portions of the blank in contact with the surfaces of the die-faces at the moment actively performing work. By placing the grooves or irregularities on the oblique, diverging, reducing, and spreading surfaces, as described, the marks made in the metal by said grooves or irregularities are obliterated in subsequent revolutions of the article treated, and the rate of the surface movement of the blank where work is being performed is the same as the rate of the linear movement of the dies. On each side of the raised portion H, near the finishing end 3, are two raised ribs or portions J H, designed to form the journals of the car-axle. In general configuration each of the raised portions J is like one-half of the surface 6 8 $h$, and each has its outer edge beveled, as seen at $n\ n$, and provided with irregularities like plane 5 6 $h$ and 8 7 $h$ to point O, where the reduction of the journal is completed. When the lateral extension of the metal has reached the required limit, it is necessary to cut or shear off squarely the end of the axle, and this is accomplished by two beveled-edge gradually-rising cutters $j\ j$, the cutting-edges of which commence near and extend to the end 3 of the die-face. The beveled faces of these cutters are also provided with irregularities, as faces 5 6 $h$, 8 7 $h$, and $n\ n$. Thus it will be seen that the operation of forcing and controlling the rotation is the same in the formation of the journals and the shearing of the axle as in the formation of the body.

In order to facilitate the manipulation of such dies and use the cutters to the best advantage, I make them separate and removable from the body of the die, the said die being provided with elongated sockets, into which the cutters are secured by wedges, shrinkage, or other suitable means. (See Figs. 5 and 6.)

I will now especially describe the dies for making spherical and conical articles.

In the said drawings, G' is the body of a die, from which projects the plane curvilinear face which commences its work at the vanishing point $h'$ of the converging forming-surfaces and finishes its work at the end K. From the point $h'$ the central or curved forming-surface $p$ of the die-face gradually deepens and spreads until it reaches the point $p'$, where the curved surface in cross-sectional dimension is about a semicircle. Intersecting the edges of the curved surface $p$ and converging in the same ratio with the said edges are two curved forming-surfaces $r'\ r'$, the differences in the curvature of the bottom of the die $p$ and the surfaces $r'\ r'$ being due to the face being relieved, as hereinafter set out. In turn the surfaces $r\ r'$ are intersected by two outer plane surfaces $q\ q$, which merge with or intersect two approximately-vertical surfaces L L, which meet the plane surface M of the die G. The lines of all these plane surfaces follow the ratio of divergence and elevation of the lines of the central curved surface, all as before stated, having their vanishing lines at $h'$.

As any article being reduced becomes variable in size, some parts of the article will slip on the dies or the article will twist. I have demonstrated by experiment that this difficulty may be obviated by relieving or cutting away the forming-faces in a gradually-diverging line, so as to avoid close contact of the articles with the die, except at or near where the work is actually being done and change of form rapidly progressing.

In sectional views, Figs. 10 and 11, I have shown the bottom of the curved forming-face relieved or cut away at $n\ n$, and in the same figures the reducing and spreading surfaces relieved or cut away abruptly in planes. (Shown at L L.) By cutting away the forming and reducing and spreading surfaces, as described, I prevent unnecessary friction between the dies and the article in process of manufacture at points where the work has been completed.

In some classes of work—the spherical and conical, for instance—to have the best finished condition I have discovered by actual experiment that it is highly desirable, if not necessary, that the cross-grooves to force and control the revolution of the blank should not extend entirely to the edge of the die where the spreading and reducing surfaces join the forming-surfaces. Therefore I have provided the spreading-surfaces $q\ q$ with cross-grooves, corrugations, or irregularities $n'\ n'$, extending part way to the edge where said surfaces $q\ q$ join the edges of the forming-surfaces. The maximum size of the curved or grooved forming-faces being one-half of the size of the sphere to be rolled, the work starting from the point $h'$, the bevels formed by the intersecting planes $r\ r'\ q\ q$ force the surplus metal of the bar gradually outwardly, while that portion between the bevels, as the forming-faces of the dies approach each other, is condensed, and is gradually brought to a spherical shape and finally drops from the end K a perfect sphere.

In the modification shown in Fig. 13 the conformation is such as to perform more work in changing form along the entire length of the blank.

In the foregoing-described dies the article is brought to shape by the dies passing once over the article, and in each case I commence by reducing the blank at the first revolution to the size required at any given point, and as the work progresses the surplus metal is forced longitudinally of the blank, leaving the shape required, while the surface of the article is condensed and compacted to a smooth surface.

I am enabled to produce forgings by this method with great rapidity and as accurately as articles can be made in a turning-lathe, each forging being an exact duplicate of the pattern from which it is fashioned. I thus secure and retain in the finished forging the compacted exterior, which gives to the metal a greater elastic limit and a more durable wearing-surface than when the article is brought to shape by turning, as the turning removes the outer condensed and compacted part, a result from forging, the retention of which is highly desirable.

The various mechanical devices and die-faces illustrated and described in this application are made the subject-matter of various applications for patents, Serial Nos. 125,633, 125,634, 135,014, 148,584, and 148,585.

The articles produced by my improved method herein set out are subject-matter of a separate application, Serial No. 160,015; and it is obvious from the foregoing description that the work proceeds in spiral lines from the point where it commences toward the ends of the blank, and that the metal is strained and spread axially.

Having thus described my invention, what I claim as new, and desire to secure by Letters Patent, is—

The method herein described of making rolled metal forgings by acting upon all parts of a metal bar in spiral lines, so as at each part in succession and upon such lines to cause the bar to rotate and to strain and spread the metal axially and compress it to the required shape and size.

GEO. F. SIMONDS.

Witnesses:
   C. E. TIBBLES,
   F. D. ELLSWORTH.